May 29, 1928.
G. A. COATS
1,671,701
SELF ALIGNING BEARING FOR POWER TRANSMISSION ATTACHMENTS
Filed Nov. 16, 1926
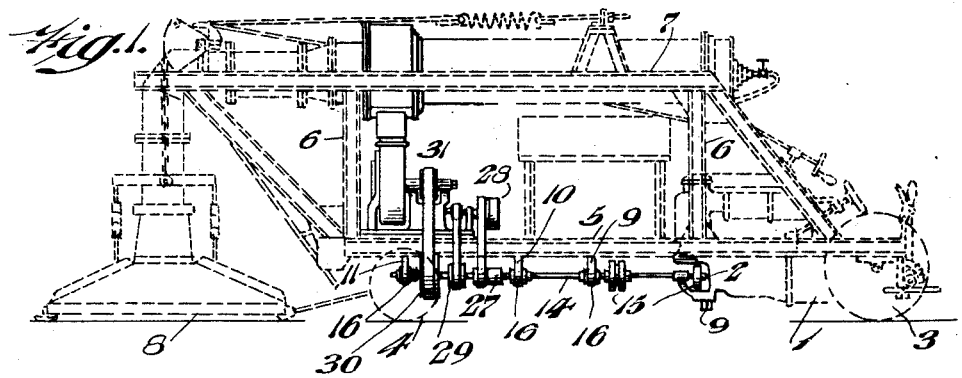
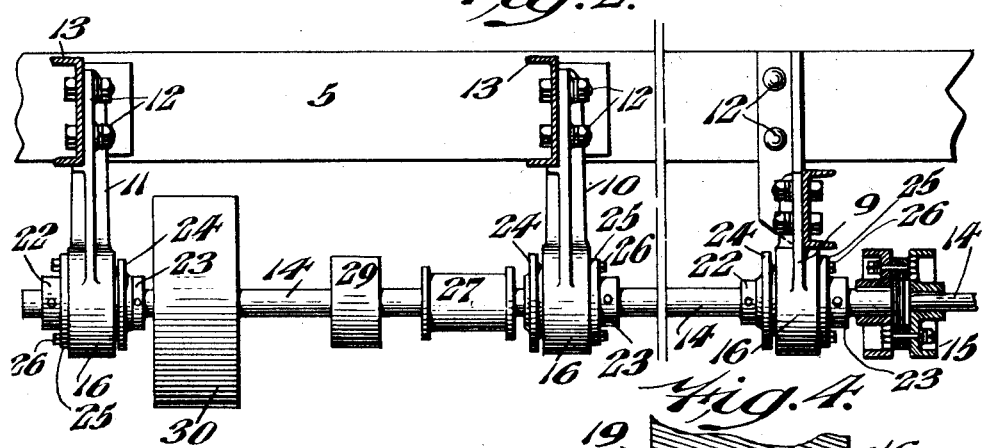
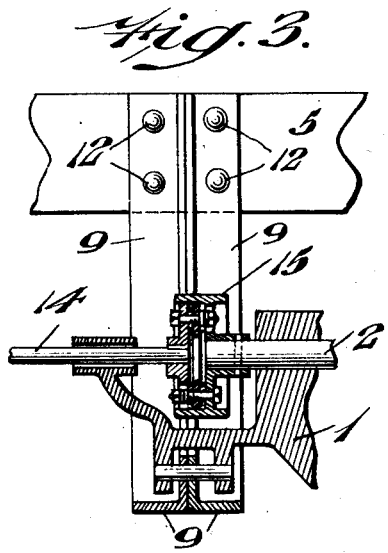
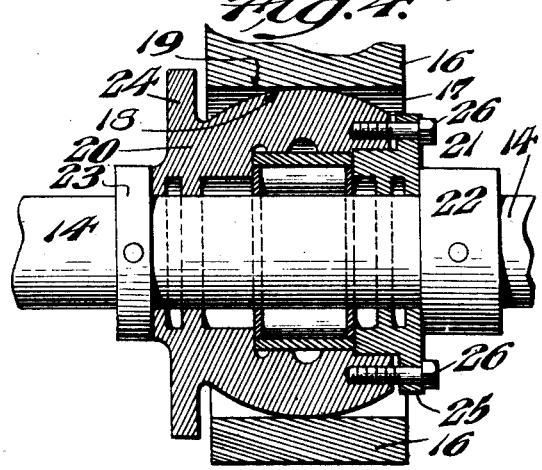
INVENTOR:
George A. Coats.
BY
ATTORNEYS.

Patented May 29, 1928.

1,671,701

UNITED STATES PATENT OFFICE.

GEORGE A. COATS, OF PHILADELPHIA, PENNSYLVANIA, ASIGNOR TO GOOD ROADS EQUIPMENT CORPORATION, OF PHILADELPHIA, PENNSYLVANIA, A CORPORATION OF DELAWARE.

SELF-ALIGNING BEARING FOR POWER-TRANSMISSION ATTACHMENTS.

Application filed November 16, 1926. Serial No. 148,670.

My invention relates to a new and useful self-aligning bearing for power transmission attachment and more particularly to a bearing of this general character adapted for use in connection with a power transmission attachment for automotive vehicles, such as automobiles, tractors and the like, where the exigencies of the road render the use of a unitary, rigid shaft impracticable.

The object of my invention is to provide a novel self-aligning bearing for auxiliary power transmission shafts on automotive vehicles so that the transmission of power from such auxiliary shaft is not in any way interfered with by the jars or vibrations of the main shaft of the vehicle due to irregularities of the road on which such vehicle is moving.

While my invention is especially directed to a self aligning bearing for auxiliary or power transmission shaft on moving machinery such as automotive vehicles, it is to be understood that the same is equally applicable to power transmission shafts connected to or mounted upon stationary or fixed machinery also, where a great amount of vibration is developed.

To the above ends, my invention consists of an auxiliary driving shaft, a plurality of fixed pulleys thereon, means for coupling said auxiliary driving shaft to the main driving shaft of an automotive vehicle or the like, and supporting means for said auxiliary shaft comprising a bearing and a spherical member adjustably mounted in said bearing, said auxiliary shaft being journalled within said spherical member and capable of adjustment with respect to said bearing, the latter being rigidly secured to said vehicle.

My invention further consists of various other novel features of construction and arrangement of parts as hereinafter described and claimed.

In the accompanying drawings,

Figure 1 represents a side elevation of a tractor equipped with a pavement heating apparatus to which power is transmitted by a power transmission attachment equipped with the self aligning bearing of my invention.

Fig. 2, is a fragmentary view in side elevation partly sectioned, upon an enlarged scale, of the part shown in full lines in Fig. 1.

Fig. 3, is a fragmentary view, partly in section, of certain parts shown at the right hand side of Fig. 1.

Fig. 4, is a fragmentary view principally in section of one of the shaft bearings other than at the tractor.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited within the scope of my claims to the precise arrangement and organization of the instrumentalities as herein shown and described.

In the drawings, and referring specifically to Fig. 1, the reference numeral 1 designates a tractor provided with the conventional driving shaft 2. The tractor is provided with the wheels 3 and 4 and spanning the wheels 3 and 4 are beams designated 5. These beams support by means of vertical beams 6 an upper beam 7. This beam 7 in turn supports in conventional style a pavement heater 8. These parts are of conventional style and have no bearing upon the present invention. Depending from the lower beams 5 are a plurality of hangers designated 9, 10, and 11 respectively. These hangers 9, 10, and 11 are secured to place by means of bolts 12, as clearly shown in Fig. 2, the hangers being bolted to the beam 5 through the instrumentality of angle irons 13. In so far as the hangers 10 and 11 are concerned, in order to couple the tractor shaft 2 with respect to the auxiliary shaft 14, use is made of the coupling shown in Fig. 3, which is designated 15 and which may be of any conventional style. The shaft 14, which is herein termed the auxiliary shaft, extends through the hangers 9, 10, and 11, as clearly shown in Fig. 2, and for each hanger a permanent part 16 is provided having arranged centrally thereof and horizontally considered a central opening 17 for each hanger, see Fig. 4. Within each central opening or bore 17 of a hanger there is arranged a somewhat spherical member 18 having a curved outer surface 19 for cooperating with the annular bore 17 of a hanger 16. This is clearly shown in Fig. 4. The member having the spherical surface 18 is designated 20 and comprises a unit clamped as at 21 between collars 22 and 23 fixed to the shaft 14, see Fig. 4. The part 20 is provided with a fixed flange 24 and a detachable flanged part 25 secured by bolts 26, the flanged part 25 abutting against collar 23, and flanged part 24 abutting against collar 22. The brackets 16 carried rigidly by the hangers 9, 10 and 11 afford a firm support for the auxiliary drive shaft 14, which, however, is flexibly or movably journalled in the bearing 17, as will be understood from Figure 4. Thus, the spherical member 20 having the ball or curved, convex surface 18 is movable in the straight surface bearing 17 thus allowing horizontal tilting or adjustment of said auxiliary shaft 14 to take up the jolts and jars caused by the progress of the tractor over a rough roadbed, or by any sudden increase or decrease of velocity, thereby guarding against the jamming or slipping of the pulleys 28, 29 and 30. It will thus be seen that while the shaft 14 is freely rotatable within the spherical member 20 and its adjuncts, it has no longitudinal movement with respect thereto and the unit as a whole has a wide range of adjustments with respect to the bearing 17, thus providing a bearing for said shaft which is capable of automatic self adjustment so that the travel of the tractor or the change in load or velocity will not in any way interfere with the revolving of the shaft or with its efficiency.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:

1. In a device of the character stated, a driven shaft, an auxiliary shaft, means for coupling said shafts, a support, a vertical hanger fixed to said support and a self aligning bearing for said auxiliary shaft carried by said support, comprising a head fixed to the lower end of said hanger and having an annular opening therethrough, a substantially spherical member journalled within said annular opening and capable of adjustment with respect to the horizontal axis thereof, said auxiliary shaft being journalled within said spherical member, and means on said shaft for maintaining said spherical member in position within said bearing.

2. In a device of the character stated, a driven shaft, an auxiliary shaft coupled thereto, a support, a vertical hanger fixed to said support and a self aligning bearing for said auxiliary shaft fixedly carried by said hanger comprising a head having an annular opening therethrough, a substantially spherical member journalled within said annular opening, said auxiliary shaft being journalled within said spherical member, and collars on said auxiliary shaft on either side of said spherical member for maintaining the latter within said bearing, said spherical member being provided with a detachable flange on one end thereof and an integral flange on the other end thereof, said flanges abutting against said collars respectively.

GEORGE A. COATS.